United States Patent
Haik et al.

(10) Patent No.: US 11,232,335 B2
(45) Date of Patent: Jan. 25, 2022

(54) PRINTING SUB-IMAGES TO CREATE COMPLETE IMAGE

(71) Applicant: HP Indigo B.V., Amstelveen (NL)

(72) Inventors: Oren Haik, Ness Ziona (IL); Noam Shaham, Ness Ziona (IL); Zelidor Fineberg, Ness Ziona (IL); Eli Velner, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 8 days.

(21) Appl. No.: 16/632,911

(22) PCT Filed: Oct. 16, 2017

(86) PCT No.: PCT/EP2017/076366
§ 371 (c)(1),
(2) Date: Jan. 22, 2020

(87) PCT Pub. No.: WO2019/076436
PCT Pub. Date: Apr. 25, 2019

(65) Prior Publication Data
US 2020/0242430 A1 Jul. 30, 2020

(51) Int. Cl.
*G06K 15/02* (2006.01)
*G06T 7/12* (2017.01)
*G06T 7/13* (2017.01)

(52) U.S. Cl.
CPC ....... *G06K 15/1851* (2013.01); *G06K 15/181* (2013.01); *G06T 7/12* (2017.01); *G06T 7/13* (2017.01); *G06T 2207/20021* (2013.01); *G06T 2207/20072* (2013.01)

(58) Field of Classification Search
None
See application file for complete search history.

(56) References Cited

U.S. PATENT DOCUMENTS

| | | | |
|---|---|---|---|
| 6,075,905 A | 6/2000 | Herman et al. | |
| 8,260,084 B2 | 9/2012 | Wang et al. | |
| 2004/0071269 A1 | 4/2004 | Wang et al. | |
| 2010/0209167 A1 | 8/2010 | Kaechi | |
| 2012/0039508 A1* | 2/2012 | Cao | G06K 9/00785 382/103 |
| 2018/0225989 A1* | 8/2018 | Elgersma | G01C 21/00 |

(Continued)

FOREIGN PATENT DOCUMENTS

| | | |
|---|---|---|
| EP | 3216616 | 9/2017 |
| KR | 20160049850 | 5/2016 |

OTHER PUBLICATIONS

Abdelfatah, R. et al., Automatic Seamless of Image Stitching, 2013, http://iiste.org/Journals/index.php/CEIS/article/download/8106/8200.

(Continued)

*Primary Examiner* — Eric A. Rust
(74) *Attorney, Agent, or Firm* — Dicke Billig & Czaja PLLC (57) ABSTRACT

In an example, an apparatus comprising an image processor is configured to perform edge detection on the image to detect a plurality of edges, automatically identify a path across the image based on the detected plurality of edges, divide the image into two adjacent sub-images based on the determined path, and generate first and second print data to cause the printing device to print the two adjacent sub-images.

23 Claims, 8 Drawing Sheets

(56) References Cited

U.S. PATENT DOCUMENTS

2018/0240247 A1* 8/2018 Cutu .................. G06T 5/002
2021/0150707 A1* 5/2021 Weisenfeld .......... G06T 7/0012
2021/0158091 A1* 5/2021 Kim .................. G06K 9/6261

OTHER PUBLICATIONS

Brown, M., Autostitch: A New Dimension in Automatic Image Stitching, Jul. 31, 2015, http://matthewalunbrown.com/autostitch/autostitch.html#publications.

Kale,. P. et al., A Technical Analysis of Image Stitching Algorithm Using Different Corner Detection Methods, Apr. 2015, https://www.ijircce.com/upload/2015/april/59_1 6_A_Techn.

Panorama Maker Program Software—Make Excellent Panoramic Photos!, http://www.stoik.com/products/photo/STOIK-PanoramaMaker/Features.

Patil, T. et al., Image Stitching Using Matlab, 2013, http://ijettjournal.org/volume-4/issue-3/IJETT-V4I3P215.pdf.

* cited by examiner

PRINTING SUB-IMAGES TO CREATE COMPLETE IMAGE

BACKGROUND

Printing devices print images on a media according to image data. Printing devices can print images that exceed the printable dimensions of the printing device by printing two or more sub-images that form the complete image. For example, prints of wallpapers, large commercial banners and panoramic photos can be printed by generating image data for two or more sub-images and printing each sub-image.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein provide methods and systems for generating printed images of images that are unprintable on a single print of a printing device. For example, prints of wallpapers, large commercial banners and wide panoramic photos may be too large to print on a single sheet. One option for printing oversized images is to print sub-images that comprise part of the large image and which can be stitched together to produce a print of the large image.

A convenient way of generating the sub-images is to take a digital representation of the complete image and use image processing techniques to divide the image into overlapping sub-images. For example, image processors can be used to select regions of the large image to make a plurality of sub-images which are printable on the printing device. Unfortunately, creating overlapping regions between sub-images has a number of side effects. These side effects may be more or less visible in the final printed output of the large image, depending on the paper handling accuracies of the printing device that is used to print the sub-images. For example, if the overlapping regions between the sub-images are too large, then the stitching areas between sub-images may become visible in the printed output. Alternatively, if the overlapping regions are too small, the stitching lines may still be visible as narrow strips between sub-images. A deviation as small as ±100 μm can make the stitching between the sub-images identifiable to the human eye. Moreover, the shape of the stitching used does not improve the situation. For example, even when using a jagged or a wavy stitching in the overlapping regions between sub-images instead of a straight line, the stitching is still distinguishable to the human eye in the final printed output. One of the reasons for this is that a naive stitching line between sub-images, which divides features in the larger image, results in easily identifiable lines between the printed sub-images on the printed output.

In certain examples herein, a method of stitching sub-images based on attributes of features in the image itself is described. The method is resilient to paper handling inconsistencies of the printing device. Furthermore, the resulting output print of the large image does not contain easily identifiable stitching lines in the overlapping regions between sub-images. Using image processing techniques, a path is automatically determined in the overlapping regions between sub-images, such that the elements with the lowest possibility of being detected from visual inspection of the printed image, are selected. In particular, the methods and systems disclosed herein select those elements of the image which effectively trick the human eye's "pattern recognition" abilities when inspecting the image. The image processing apparatus described herein may use one or more image processing techniques to identify the particular elements in the image that result in improved stitching between adjacent sub-images. For example, in one case the apparatus identifies graphic edges in the image data corresponding to the image, and automatically determines a path that follows one or more detected edges. The resulting line is less visible to the human eye than, say, a line which divides two regions of an image where there is greater similarity between image attributes.

Figure 1:
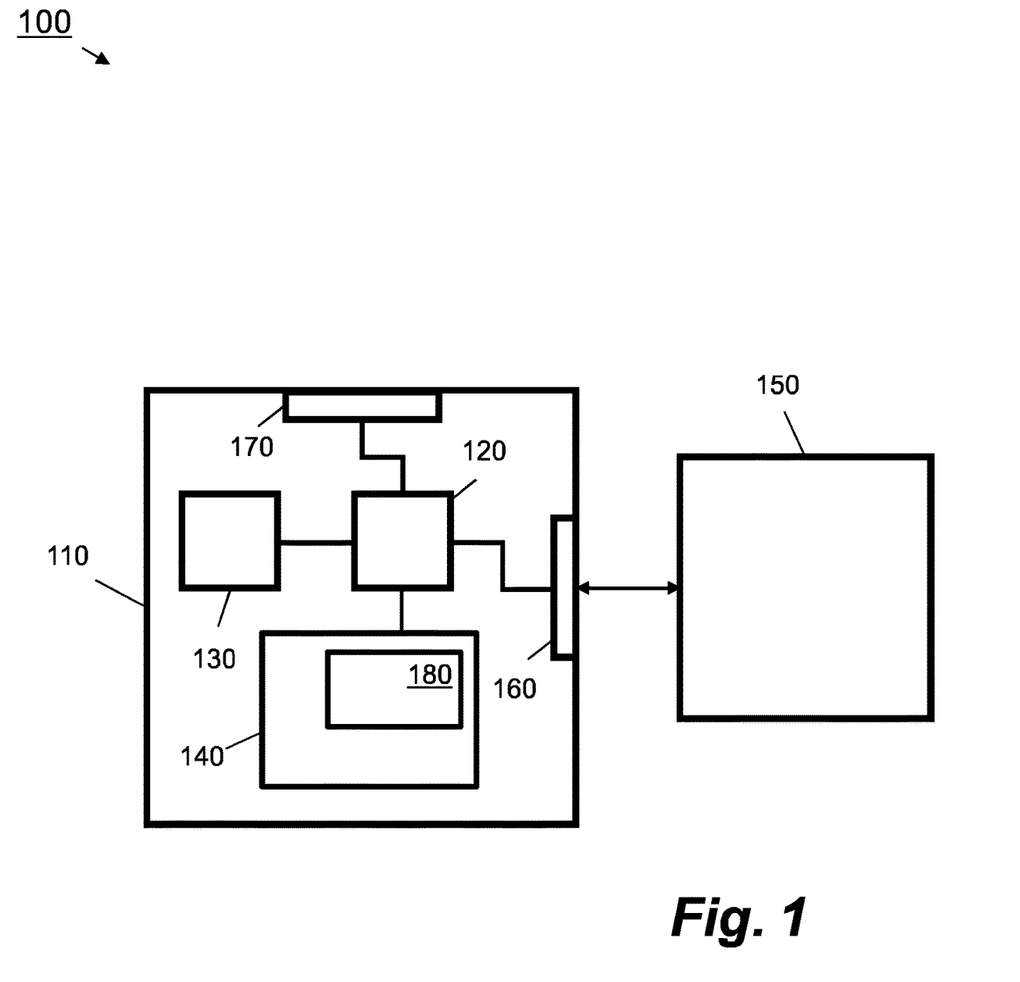
FIG. 1 is a schematic diagram showing an apparatus for generating print data according to an example.

FIG. 1 is a simplified schematic diagram of an apparatus 100 according to an example. Certain examples described herein may be implemented within the context of the apparatus 100. The apparatus 100 comprises an image processor 110. The image processor 110 shown in FIG. 1 comprises a central processing unit (CPU) 120, a graphic processing unit (GPU) 130 and a memory 140 storing instructions 180 for automatically dividing an image into two adjacent sub-images based on attributes of the image data. The CPU 120 is arranged to process data such as image data. In the present disclosure, "image data" may comprise any digital representation of an image i.e. a numerical representation of a two-dimensional image, for example as pixels. A "sub-image" of an image comprises at least part of the image. Similarly "sub-image data" may comprise a subset of image data corresponding to a sub-image.

The apparatus 100 shown in FIG. 1 is arranged to generate print data according to examples described herein. The image processor 110 is shown communicatively coupled to a printing device 150. Herein, "print data" comprises any data operable to cause the printing device 150 to print an image, for example, instructions to cause the printing device 150 to deposit printing fluid at locations on a substrate to produce a printed output. In the apparatus 100 shown in FIG. 1, either the image processor 110 or the printing device 150 may be arranged to generate print data on the basis of image data. For example, the CPU 120 of the image processor 110 may generate print data that may be sent to the printing device via an interface 160. Alternatively, a print controller (not shown in FIG. 1) in the printing device 150 may generate print data from image data that is received from the image processor 110.

In FIG. 1, the CPU 120 is communicatively coupled to the memory 140. The memory 140 may be any volatile or non-volatile memory arranged to store data and may be read-only or readable and writable memory. The CPU 120 is communicatively coupled to the GPU 130. The GPU 130 is a special purpose processing unit arranged to send and receive data from the CPU 120. According to an example, the GPU 130 may receive image data from the CPU 120 and render graphics that can be displayed on a graphics display. The GPU can also perform general purpose and print related image processing tasks that are not limited to rendering graphics on the display. The image processor 110 further comprises an interface 170 which allows one or more graphics displays to be communicatively coupled to the image processor 110 and allow a user to interact with the image processor 110.

The apparatus 100 further comprises the printing device 150 which is coupled to the image processor 110 via the interface 160. The printing device 150 is arranged to receive image data and/or print data from the image processor 110. The printing device 150 can generate a printed output on a substrate, when instructed to do so by a print controller, according to print data.

According to examples described herein, the printing device 150 is limited to generate printed outputs according to certain printing parameters that are specified by print configuration data of the printing device 150. For example, the printing device 150 may be able to generate printed outputs that are limited in one or more dimensions such as length or width, e.g. up to a maximum size of 1 m×0.5 m. Herein, an image defined by image data is said to be "printable" by the printing device 150 if print data can be sent to the printing device such that the printing device 150 can generate a printed output according to the print data. Otherwise the image is said to be "unprintable".

In certain examples of the apparatus 100 described herein, the image processor 110 is arranged to generate printable sub-images of an unprintable image. In particular, the image processor 110 is arranged to generate printable sub-images where the resulting output from the print device is such that that the individual printed sub-images are less distinguishable in the composite image that makes up the original (unprintable) image in the final printed output.

In FIG. 1, the apparatus 100 is configured by instructions 180 to process image data of an image that is unprintable on the printing device 150, as will now be described.

According to a first example, the apparatus 100 may be arranged to receive image data from a device external to the apparatus 100. Alternatively, the CPU 120 of the image processor 110 may access image data stored in the memory 140.

Once the image data is accessed, the image is partitioned into sub-images. Herein a "partition" of the image into sub-images is a division of the image into a number of individual sub-images that together comprise the image. In one example, the image processor 110 is configured to generate a partition of the image into at least two adjacent sub-images. The at least two adjacent sub-images are chosen with intersecting regions, and may or may not themselves be printable on the printing device 150.

The partitioning may be performed in such a way to ensure the resulting at least two adjacent sub-images are printable on the printing device 150. In one case, a user can check whether a partitioning of the image into at least two adjacent sub-images is such that the sub-images are printable by checking the sub-images of the image conform to the print parameters of the printing device 150. Alternatively, the image processor 110 may be arranged to receive the print configuration data from the printing device 150 and determine whether the at least two adjacent sub-images are printable on the printing device 150.

Figure 2A:
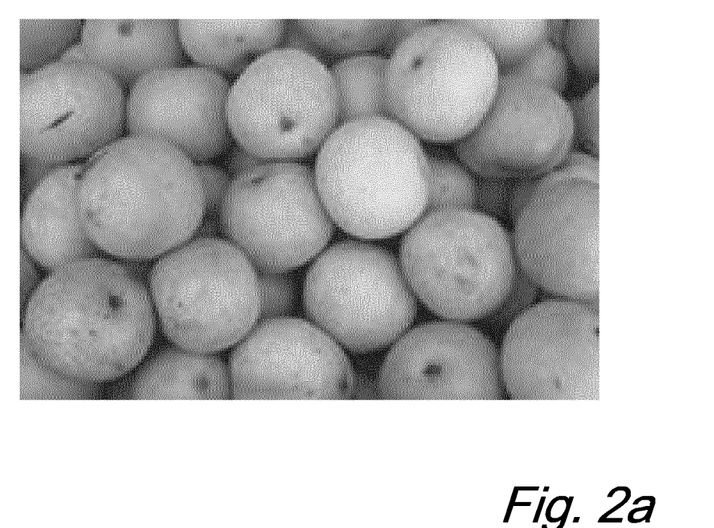
FIG. 2a is an illustration showing example image data.
Figure 2B:
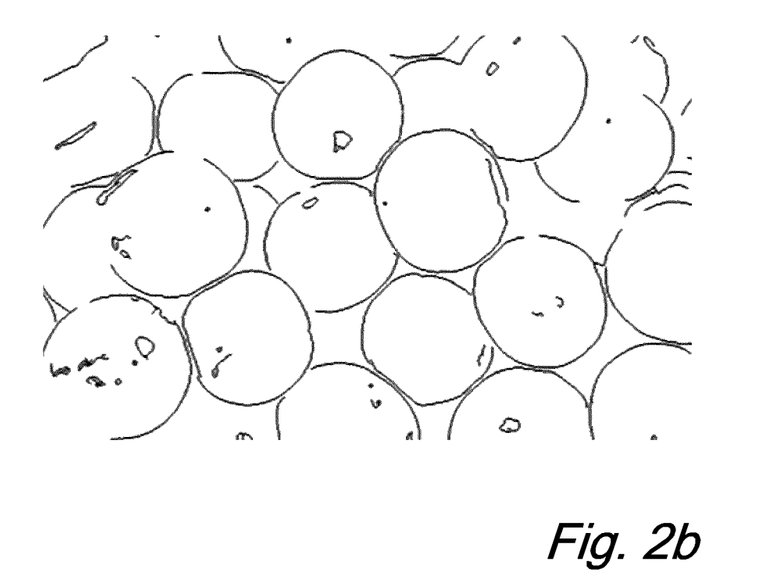
FIG. 2b is an illustration showing edges detected in the image data of FIG. 2a according to an example.

In operation the apparatus 100 is configured to automatically determine a path across the image represented by the image data from a first side of the image to a second opposite side of the image such that the path divides the image into two adjacent sub-images. According to an example, if the image is a colour image, the image processor 110 first converts the colour image to a grey-scale image as shown in FIG. 2a. An edge detection algorithm is the applied to the grey-scale image to identify edges in the image. Example edge detection algorithms that may be used include Canny edge detection, Deriche edge detector, Sobel operator, Prewitt operator, etc. FIG. 2b illustrates an example of detected edges when an edge detect algorithm is applied to the image shown in FIG. 2a.

Figure 2C:
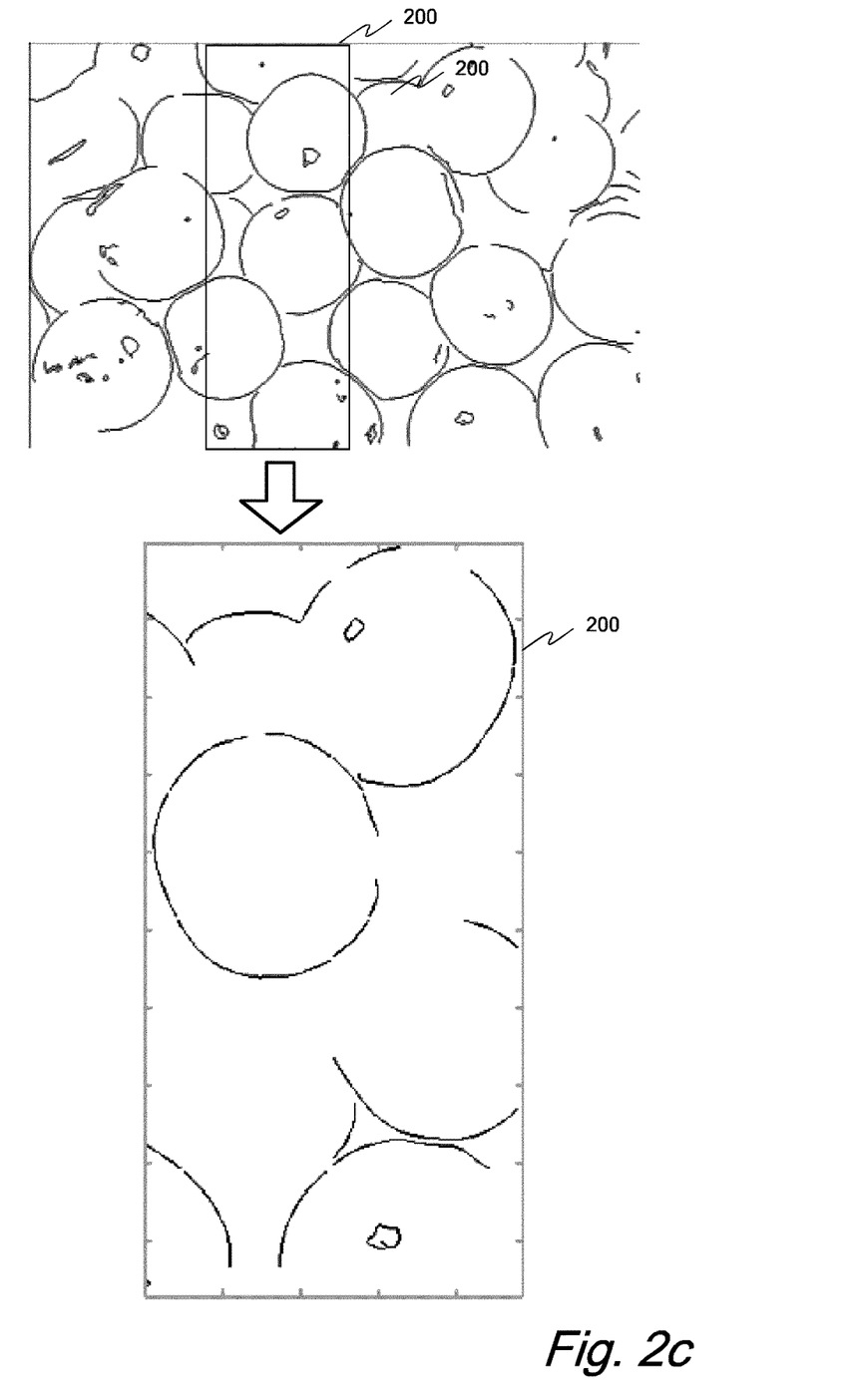
FIG. 2c is an illustration showing determination of a region of interest are in the image data of FIG. 2a according to an example.

Once edges in the image have been identified, the image processor 110 is arranged to identify a region of interest area 200 within the image which includes the most edges (for example the greatest density of detected edges). FIG. 2c illustrates a region of interest 200 selected from the detected edges shown in FIG. 2b. The region of interest area 200 may have a predefined width (for example 100 mm) or the width of the region of interest may depend on the dimensions of the image or abilities of the printing device 150. All graphical edges within the region of interest are converted to contours, with each contour in the region of interest 200 assigned a unique number.

Figure 2D:
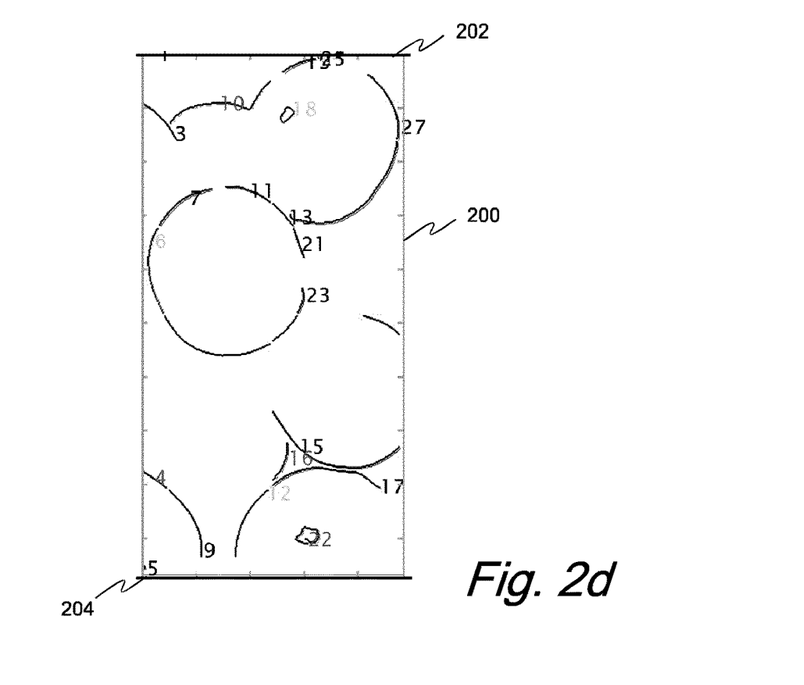
FIG. 2d is an illustration of contours converted from detected edges in the region of interest of FIG. 2c according to an example.
Figure 3:
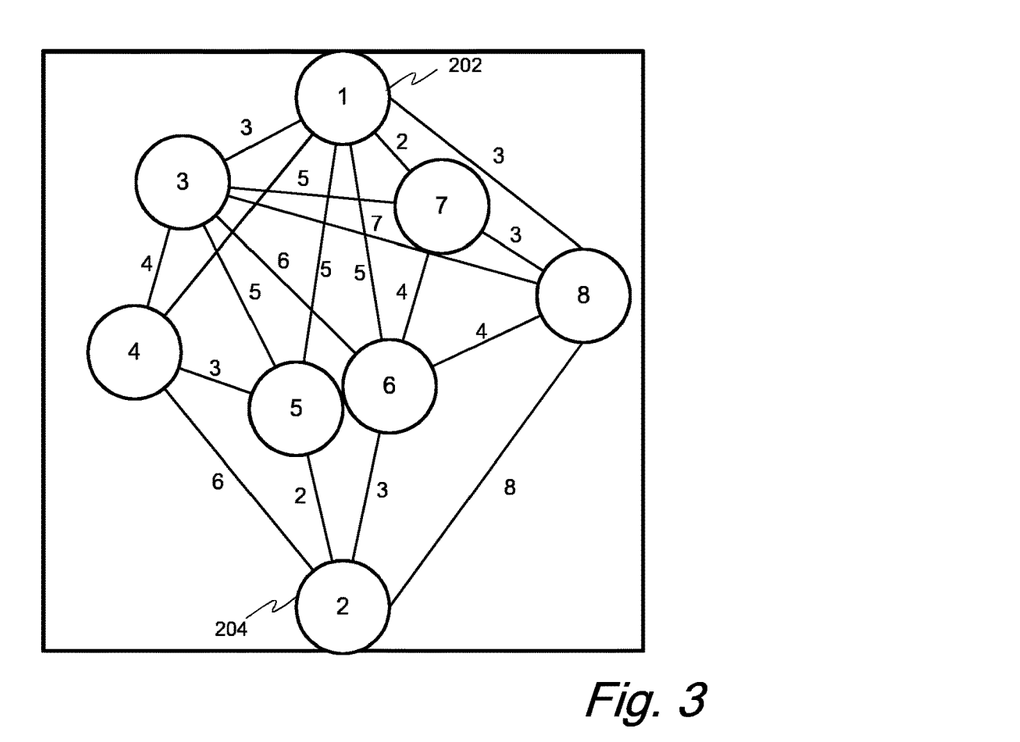
FIG. 3 is an example graph comprising nodes representing the contours of FIG. 2d according to an example.

Often, as illustrated in FIG. 2d, there will not be a single uninterrupted edge, or contour, which spans the entire width of the image. Therefore, to identify a path across the image the image processor 110 may select a plurality of contours to form portions of the path. According to an example, this may be achieved by applying graph theory techniques to the detected edges within the region of interest 200. To this end, the contours may be mapped as nodes of a graph with a plurality of edges, or arcs, of the graph each arc coupling two nodes and having a weight corresponding to the shortest distance in the image between the two contours represented by the nodes. That is, the weights are calculated as the shortest distance in the image between the two detected graphical edges for any two points on the respective graphical edges. An example graph showing nodes and weighted arcs between nodes is illustrated in FIG. 3.

To identify the path across the image to be used to divide the image into the two adjacent sub-images, the image processor 110 analyses the graph to determine the shortest path through the graph based on the weight values associated with each arc. For example, in the example graph illustrated in FIG. 3, the shortest path between a source node "1" and a destination node "2" is determined. In some examples, the shortest path through the graph may be identified using Dijkstra's algorithm.

According to some examples, rather than providing arcs between a node and all other nodes, the graph of contours may include arcs for each node to a sub-set of the other nodes, for example the k nearest neighbours of a node. This may significantly reduce the computational complexity of the path determination, particularly when k is a relatively small number (e.g. for values of k between 2 and 4).

Figure 4:
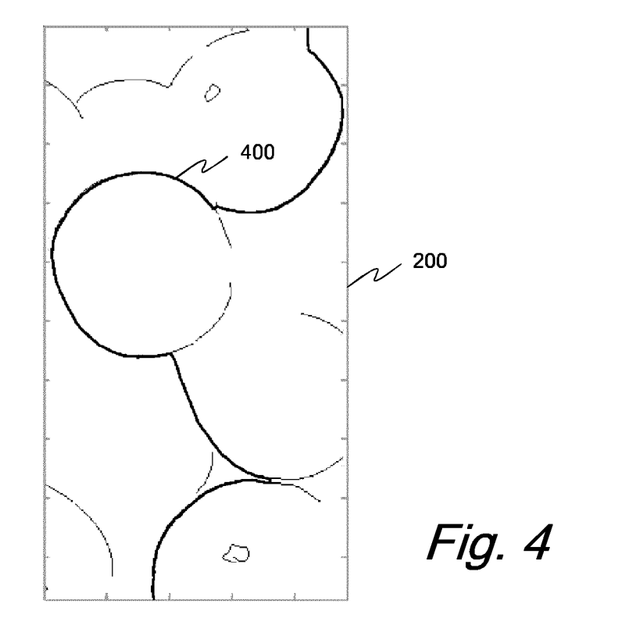
FIG. 4 is an illustration of a determined path through the image according to an example.

The image processor 110 determines the path 400 from one side to another side of the image based on the determined shortest path through the graph. For example, the path across the image may be generated by combining the contours identified by the selected nodes with linear portions representing the shortest distance between adjacent contours, as illustrated in FIG. 4. The image processor 110 is configured to divide the image into at least two adjacent sub-images based on the path 400 across the image.

Figure 5A:
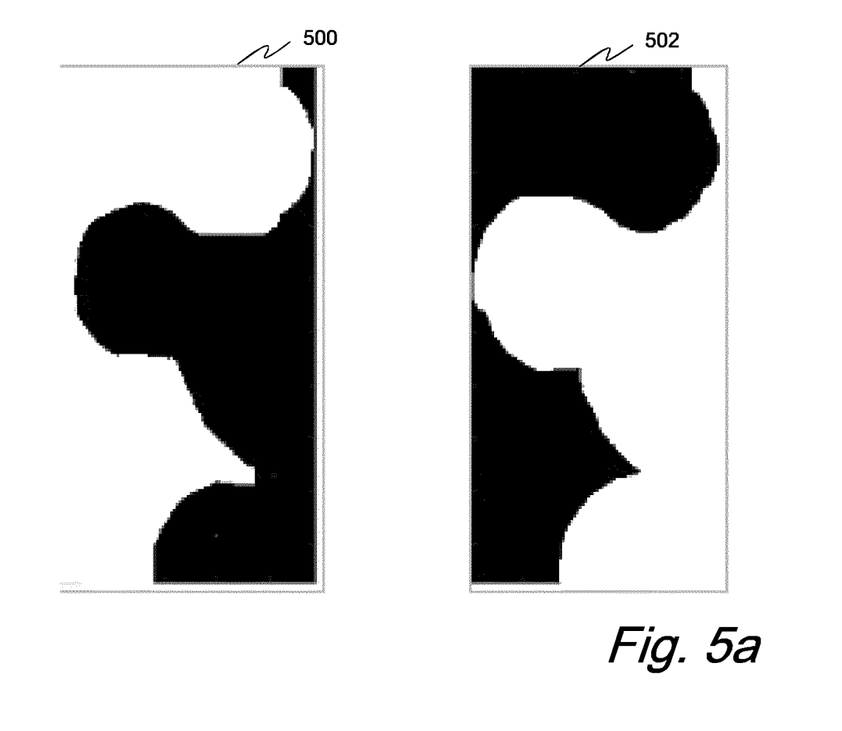
FIG. 5a is an illustration of a complimentary binary mask based on the path of FIG. 4 according to an example.

According to an example, the path 400 across the image is used to generate complementary binary masks 500, 502 illustrated in FIG. 5a. These masks can be combined with the original image, e.g. by multiplying the mask with the image, to generate the two sub-images.

Figure 5B:
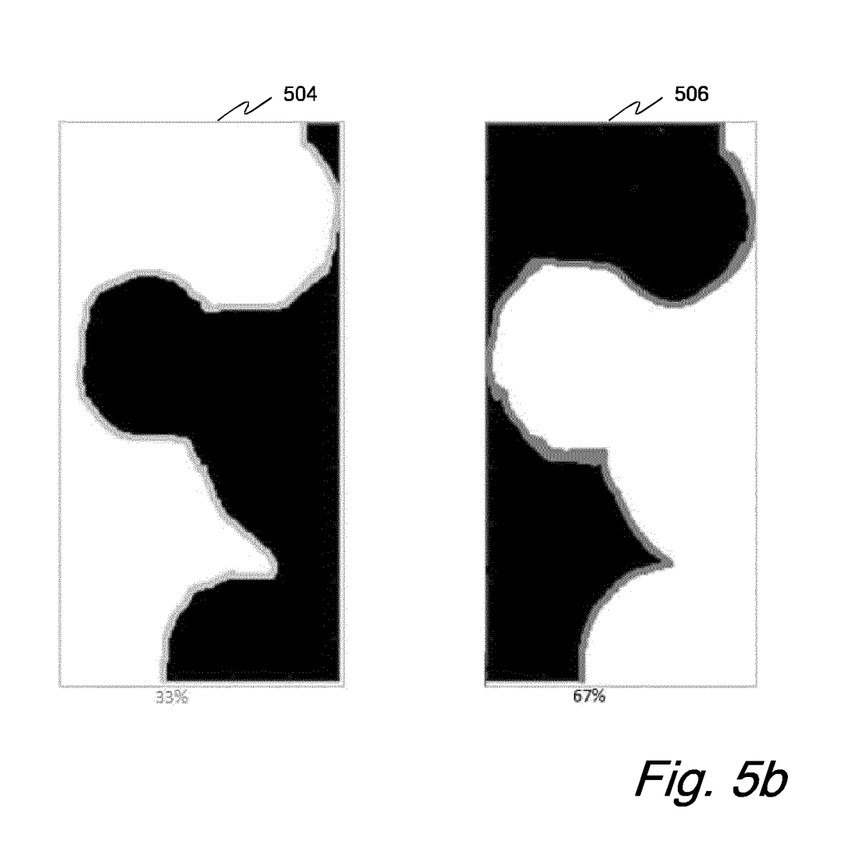
FIG. 5b is an illustration of the complimentary binary mask of FIG. 5a with alpha-blending applied according to an example.

According to some examples, the mask may be blurred, or alpha blended to provide a smoother frame to frame transition when printing the sub-images. The length and condensity of the blend may be controlled to reduce visible artifacts in the final printed image. FIG. 5b illustrate complimentary masks 504, 506 with alpha-blending of 3 pixels long with 33% condensity on one side and 67% on the other.

In non-ideal printing devices, when printing the sub-images, 33% from one sub-image plus 67% from the second sub-image may bot equal 100% density in the final printed image. To reduce the visibility of the stitch in the final printed image, in some examples, the grey levels of the original digital image within the transition area, corresponding to the alpha-blend length, by a factor (e.g. 80%).

Figure 6:
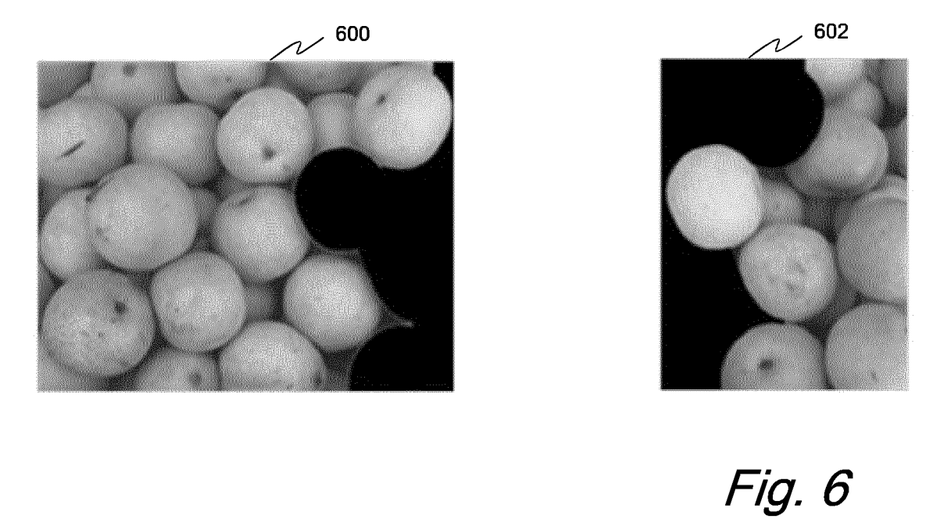
FIG. 6 is an illustration of adjacent sub-images generated by combining the complimentary masks of FIG. 5b with the example image data of FIG. 2 according to an example.

The image processor 110 may then multiply the generated complimentary masks with the original image data to generate the two sub-images 600, 602 illustrated in FIG. 6. This results in at least two modified adjacent sub-images, each of which is printable on the printing device 150.

The apparatus 100 is configured to generate at least first and second print data, operable to cause the printing device 150 to print at least first and second prints, respectively, on the basis of the dividing of the adjacent sub-images by the automatically determined path. As noted previously, the image processor 110 may be arranged to generate the print data from the image data, subsequent to the dividing of image between the at least two adjacent sub-images. In an example, the image data resulting from the dividing of the image into at least two modified adjacent sub-images, based on the automatically determined path 400, may be sent to the printing device 150 that is arranged to generate print data based on the received image data e.g. at a print controller (not shown in FIG. 1).

Similarly to the at least two adjacent sub-images defined by the partitioning of the image, the image processor 110, can determine if the modified adjacent sub-images, which result from dividing the spanning region between the adjacent sub-images, are printable on the printing device. In the case that the modified adjacent sub-images are not printable, a new partitioning comprising printable adjacent sub-images or such that the resulting modified sub-images are printable can be determined.

Figure 7:
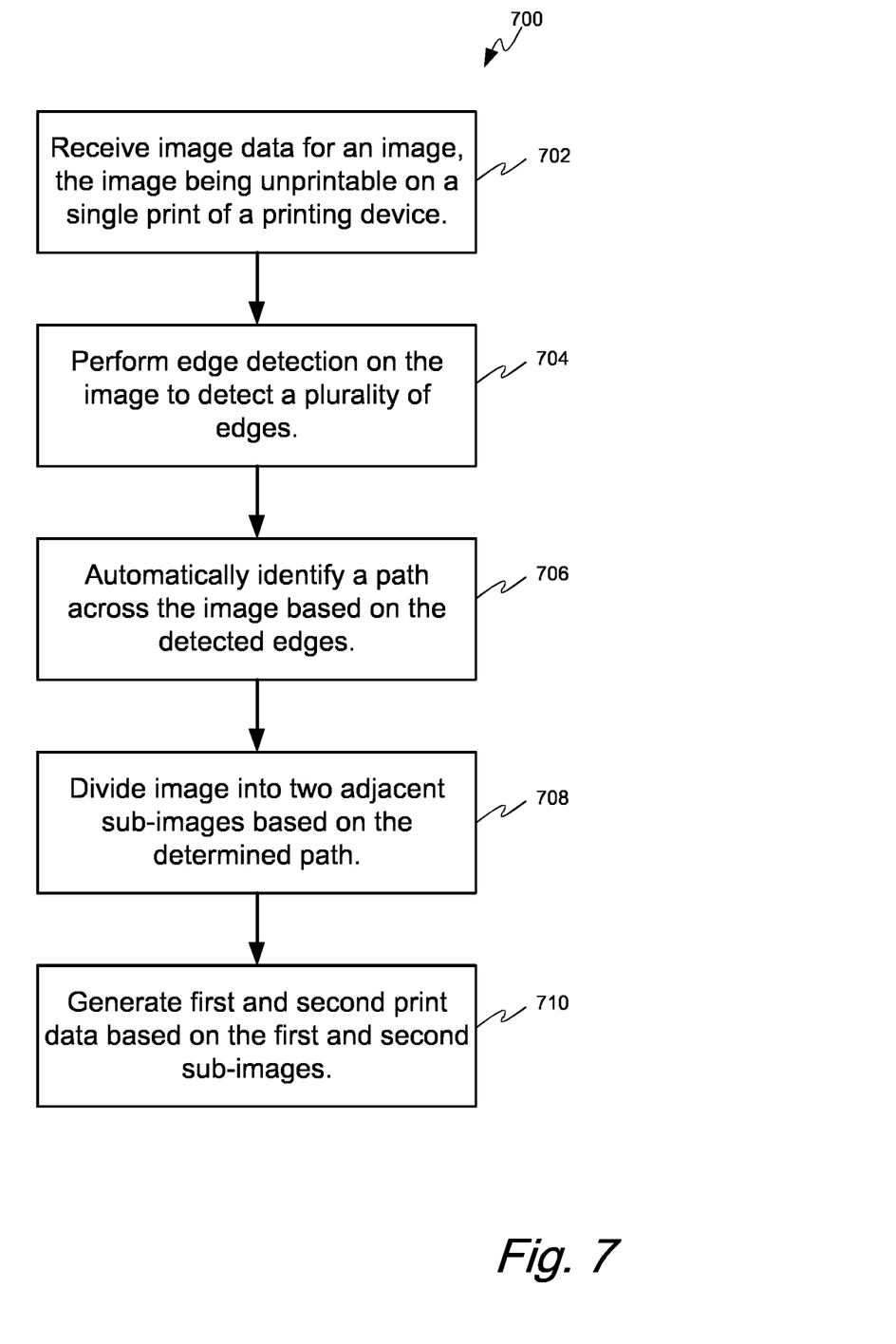
FIG. 7 is a schematic diagram showing a method of generating print data according to an example.

FIG. 7 is a block diagram showing a method 700 of generating print data according to an example. The method 700, which is shown in FIG. 7 may be used in conjunction with the apparatus 100 shown in FIG. 1 to generate print data. At block 702, image data for an image that is unprintable on a single print of a printing device is received. The image data may be received by the image processor 110 of the apparatus 100 shown in FIG. 1. If the image data comprises a colour image, it may be converted to grey scale prior to continuing with the method. At block 704, the edge detection is performed on the image data to detect a plurality of edges in the image, for example as illustrated in FIG. 2b. At block 706, a path 400 across the image is automatically identified based on the detected edges. At block 708, the image is divided into two-adjacent sub-images based on the determined path across the image resulting in at least two adjacent sub-images that are printable on a single print of the printing device. At block 710, first and second print data, corresponding to the first and second sub-images and operable to cause the printing device to print at least first and second prints respectively, is generated. Additionally, the sending of print data to a printing device may be followed by block 710.

In some examples, the method includes identifying a region of interest area 200 within the image by identifying a region of the image having the greatest number of concentration of detected edges. A width of the region of interest may be determined based on characteristics of a printing device or may be a predetermined value, e.g. 100 mm. In some examples, the method includes converting the detected edges within the region of interest to contours and assigning each contour within the region of interest 200 a unique identifying number.

In some examples, the method includes generating a graph having a plurality of nodes representing contours and arcs connecting pairs of nodes, and assigning a weight to each arc, the weight assigned to each arc representative of a shortest distance between the two contours represented by the respective nodes. In some examples, rather than providing arcs between a node and all other nodes, arcs corresponding the k nearest other nodes may be generated for each individual node, where k equals a relatively low number (e.g. for k between 2 and 4).

Graph analysis techniques may then be applied to determine a shortest path through the graph from a source node associated with one edge of the image, to a destination node, associated with another opposite edge of the image. For example, Dijkstra's algorithm may be used. The nodes associated with the determined shortest path through the graph then define contours forming a path 400 across the image to be used to divide the image into two adjacent sub-images.

According to some examples, a source node may represent a first contour 202 comprising a line aligned with a first edge of the reason of interest, e.g. a line having the same width as the region of interest and spanning a first side of the region of interest. Similarly a destination node may represent a second contour 204 comprising a line aligned with a second edge, opposite to the first edge, of the region of interest.

According to some examples, the method may further include generating complimentary binary masks 500, 502 based on the path 400 across the image. Alpha-blending may be applied to the edge of the complimentary masks 504, 506 to provide smoother frame to frame transition when printing the sub-images. Grey levels of the image in the transition area may be adjusted by a factor (e.g. 80%) to help further reduce visibility of the stitch path in the final printed image.

The adjacent sub-images may then be generated by multiplying the original image data with the complimentary masks, with or without alpha-blending. This results in at least two modified adjacent sub-images, each of which is printable on the printing device 150.

The methods and systems described herein provide a means for printing an oversized image that is too large to print on a printing device. Printing sub-images of the image based on a naive stitching process, where images are stuck together edge to edge, results in an unsatisfactory and low quality print of the image where the borders between the sub-images can easily be recognized. Due to the human eye's high pattern-recognition capabilities, even narrowly overlapping regions between sub-images in a stitching can easily be distinguished in the final print. The present methods and apparatus addresses this by automatically determining a path across an image based on edges detected in the image, and dividing the image on the basis of the determined path in a way such that the resulting paths between sub-images are hard to detect on visual inspection. This results in higher quality printed output for the over-sized image. The methods and apparatus disclosed herein produce a seamless printed output of an enhanced quality over previous techniques.

Figure 8:
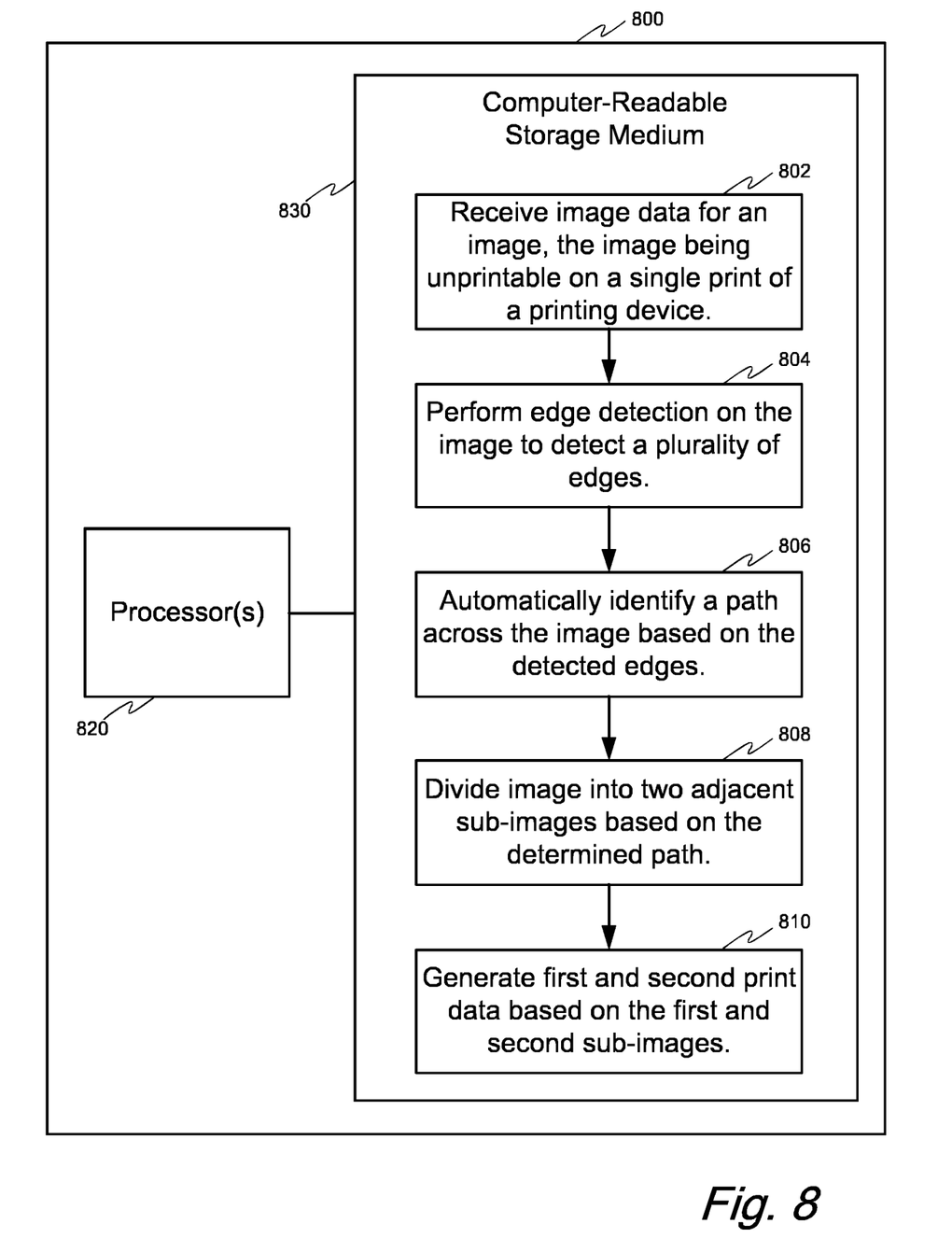
FIG. 8 is a schematic block diagram of a computer system according to an example.

Certain methods and systems as described herein may be implemented by one or more processors that processes program code that is retrieved from a non-transitory storage medium. FIG. 8 shows an example 800 of a device comprising a computer-readable storage medium 830 coupled to at least one processor 820. The computer-readable media 830 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In FIG. 8, the computer-readable storage medium comprises program code to: receive image data for an image, the image being unprintable on a single print of a printing device 802, perform edge detection on the image to detect a plurality of edges 804, automatically identify a path across the image based on the detected edges 806, divide the image into two adjacent sub-images based on the determined path 808, and generate at least first and second print data operable to cause the printing device to print the two adjacent sub-images 810.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of generating print data for a printing device, the method comprising:
    receiving image data of an image, the image being unprintable on a single print of the printing device;
    performing edge detection on the image to detect a plurality of edges;
    automatically identifying a path across the image based on the detected plurality of edges, including:
        transforming each edge of the plurality of edges to a contour;
        generating a graph for the plurality of contours, wherein each contour is represented by a node in the graph, the graph having a plurality of arcs between the nodes, each arc representing the shortest distance between two nodes connected by that arc; and
        determining a shortest path between a source node and a destination node in the graph;
    dividing the image into two adjacent sub-images based on the determined path; and
    generating first and second print data to cause the printing device to print the two adjacent sub-images.

2. The method of claim 1, wherein generating the graph further comprises for each node in the graph identifying a predetermined number of nearest other nodes and for each identified other node generating an arc representing the shortest distance between the node and the other node.

3. The method of claim 1, wherein determining the shortest path comprises determining the shortest path using the Dijkstra algorithm.

4. The method of claim 1, further comprising:
    converting the received image data to grey-scale image data; and
    wherein performing edge detection on the image comprises performing edge detection on the grey-scale image data.

5. The method of claim 1, further comprising:
    identifying a region of the image having a highest density of detected edges; and
    wherein the transforming, generating and determining are performed on image data corresponding with the identified region of the image.

6. The method of claim 5, wherein the region of the image comprises a predetermined width.

7. The method of claim 1, wherein performing edge detection on the image comprises performing edge detection using the Canny edge detection algorithm.

8. The method of claim 1, further comprising printing the respective first and second sub-images on the printing device based on the first and second print data.

9. The method of claim 1, wherein dividing the image into two adjacent sub-images based on the determined path further comprises building first and second binary masks based on the determined path, wherein the first binary mask is an inverse of the second binary mask.

10. The method of claim 9, wherein dividing the image into two adjacent sub-images further comprises applying alpha blending to a border region of the first and second binary masks, the border region corresponding to the determined path.

11. The method of claim 9, wherein dividing the image into two adjacent sub-images further comprises multiplying the image by the first binary mask to generate a first sub-image and by the second binary mask to obtain the second sub-image.

12. A method of generating print data for a printing device, the method comprising:
    receiving image data of an image, the image being unprintable on a single print of the printing device;
    performing edge detection on the image to detect a plurality of edges;
    automatically identifying a path across the image based on the detected plurality of edges;

dividing the image into two adjacent sub-images based on the determined path; and generating first and second print data to cause the printing device to print the two adjacent sub-images, wherein dividing the image into two adjacent sub-images based on the determined path further comprises building first and second binary masks based on the determined path, wherein the first binary mask is an inverse of the second binary mask.

13. The method of claim 12, wherein dividing the image into two adjacent sub-images further comprises applying alpha blending to a border region of the first and second binary masks, the border region corresponding to the determined path.

14. The method of claim 12, wherein dividing the image into two adjacent sub-images further comprises multiplying the image by the first binary mask to generate a first sub-image and by the second binary mask to obtain the second sub-image.

15. The method of claim 12, wherein identifying a path across the image based on the detected plurality of edges further comprises:

transforming each edge of the plurality of edges to a contour;

generating a graph for the plurality of contours, wherein each contour is represented by a node in the graph, the graph having a plurality of arcs between the nodes, each arc representing the shortest distance between two nodes connected by that arc; and determining a shortest path between a source node and a destination node in the graph.

16. A non-transitory computer-readable storage medium storing instructions that, when executed by one or more processors, cause the one or more processors to:

receive image data of an image, the image being unprintable on a single print of a printing device;

perform edge detection on the image to detect a plurality of edges;

automatically identify a path across the image based on the detected plurality of edges, including:

transform each edge of the plurality of edges to a contour;

generate a graph for the plurality of contours, wherein each contour is represented by a node in the graph, the graph having a plurality of arcs between the nodes, each arc representing the shortest distance between two nodes connected by that arc; and determine a shortest path between a source node and a destination node in the graph;

divide the image into two adjacent sub-images based on the determined path; and generate first and second print data to cause the printing device to print the two adjacent sub-images.

17. The non-transitory computer-readable medium of claim 16, wherein the instructions, when executed by the one or more processors, cause the one or more processors to:

build first and second binary masks based on the determined path, wherein the first binary mask is an inverse of the second binary mask.

18. The non-transitory computer-readable medium of claim 17, wherein the instructions, when executed by the one or more processors, cause the one or more processors to:

apply alpha blending to a border region of the first and second binary masks, the border region corresponding to the determined path.

19. The non-transitory computer-readable medium of claim 17, wherein the instructions, when executed by the one or more processors, cause the one or more processors to:

multiply the image by the first binary mask to generate a first sub-image and by the second binary mask to obtain the second sub-image.

20. An apparatus comprising:

a processor; and a memory storing instructions to:

receive image data of an image, the image being unprintable on a single print of a printing device;

perform edge detection on the image to detect a plurality of edges;

transform each edge of the plurality of edges to a contour;

generate a graph for the plurality of contours, wherein each contour is represented by a node in the graph, the graph having a plurality of arcs between the nodes, each arc representing the shortest distance between two nodes connected by that arc;

determine a shortest path between a source node and a destination node in the graph;

divide the image into two adjacent sub-images based on the determined shortest path; and generate first and second print data to cause the printing device to print the two adjacent sub-images.

21. The apparatus of claim 20, the memory storing instructions to:

divide the image into two adjacent sub-images based on the determined path further comprises building first and second binary masks based on the determined path, wherein the first binary mask is an inverse of the second binary mask.

22. The apparatus of claim 21, the memory storing instructions to:

apply alpha blending to a border region of the first and second binary masks, the border region corresponding to the determined path.

23. The apparatus of claim 21, the memory storing instructions to:

multiply the image by the first binary mask to generate a first sub-image and by the second binary mask to obtain the second sub-image.

* * * * *